United States Patent
Takahashi et al.

(10) Patent No.: US 8,849,245 B2
(45) Date of Patent: Sep. 30, 2014

(54) MOBILE COMMUNICATION METHOD, MOBILE COMMUNICATION SYSTEM, AND RADIO BASE STATION

(75) Inventors: Hideaki Takahashi, Tokyo (JP); Wuri Andarmawanti Hapsari, Tokyo (JP); Anil Umesh, Tokyo (JP); Mikio Iwamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 46 days.

(21) Appl. No.: 13/817,245

(22) PCT Filed: Aug. 12, 2011

(86) PCT No.: PCT/JP2011/068448
§ 371 (c)(1),
(2), (4) Date: Apr. 22, 2013

(87) PCT Pub. No.: WO2012/023514
PCT Pub. Date: Feb. 23, 2012

(65) Prior Publication Data
US 2013/0203382 A1    Aug. 8, 2013

(30) Foreign Application Priority Data

Aug. 16, 2010   (JP) .................................. 2010-181873

(51) Int. Cl.
*H04W 12/10* (2009.01)
*H04W 4/00* (2009.01)
*H04W 76/02* (2009.01)
*H04B 7/26* (2006.01)
*H04B 7/24* (2006.01)
*H04W 84/04* (2009.01)

(52) U.S. Cl.
CPC .................. *H04W 12/10* (2013.01); *H04B 7/26* (2013.01); *H04B 7/24* (2013.01); *H04W 4/00* (2013.01); *H04W 76/022* (2013.01); *H04W 84/047* (2013.01)
USPC ........................................................ 455/410

(58) Field of Classification Search
CPC .......... H04W 12/10; H04W 4/00; H04B 7/24; H04B 7/26
USPC ........................................................ 455/410
See application file for complete search history.

(56) References Cited

U.S. PATENT DOCUMENTS 8,699,711 B2 *   4/2014  Mukherjee et al. ........... 380/270
2011/0305339 A1 * 12/2011  Norrman et al. .............. 380/270

OTHER PUBLICATIONS

International Search Report issued in PCT/JP2011/068448 mailed Sep. 20, 2011 (2 pages).
3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)"; Mar. 2010 (31 pages).

(Continued)

*Primary Examiner* — Asghar Bilgrami
(74) *Attorney, Agent, or Firm* — Osha Liang LLP

(57) ABSTRACT

The present invention relates to a mobile communication method that sends and receives the signaling of an S1AP/X2AP layer on DRB established between a radio base station DeNB and a relay node RN, the mobile communication method including: a step of setting the above DBR in an attach process of the relay node RN; and a step of notifying the above DRB to the relay node RN and the radio base station DeNB in an attach process of the relay node RN.

3 Claims, 11 Drawing Sheets

(56) References Cited

OTHER PUBLICATIONS

3GPP TS 36.413 V9.3.0; "3rd Generation Partnership Project; Technical Specification Group Radio Access Network; Evolved Universal Terrestrial Radio Access Network (E-UTRAN); S1 Application Protocol (S1AP) (Release 9)"; Jun. 2010; pp. 22-24; 28-30 (7 pages).
3GPP TS 36.331 V9.3.0; "3rd Generation Partnership Project; Technical Specification Group Radio Access Network; Evolved Universal Terrestrial Radio Access (E-UTRA); Radio Resource Control (RRC); Protocol specification (Release 9)"; Jun. 2010; pp. 106-107; 143-144; 152-153 (7 pages).
3GPP TS 36.300 V10.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Jun. 2010 (183 pages).
3GPP TS 33.401 V9.4.0; "3rd Generation Partnership Project; Technical Specification Group Services and System Aspects; 3GPP System Architecture Evolution (SAE); Security architecture (Release 9)": Jun. 2010 (104 pages).
3GPP TS 36.300 V10.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Jun. 2011 (194 pages).
3GPP TS 36.331 V10.2.0; "3rd Generation Partnership Project; Technical Specification Group Radio Access Network; Evolved Universal Terrestrial Radio Access (E-UTRA); Radio Resource Control (RRC); Protocol specification (Release 10)"; Jun. 2011 (295 pages).
Office Action mailed Sep. 13, 2011 in corresponding Japanese Application No. 2010-181873 (5 pages).
Decision of Refusal mailed Mar. 13, 2012 in corresponding Japanese Application No. 2010-181873 (6 pages).
Office Action mailed Dec. 19, 2012 in corresponding Japanese Application No. 2012-133803 which is a Divisional Application of Priority Claimed Application No. JP2010-181873 (6 pages).
SA3; "Review of contribution R3-093305 on 'Text proposal to TR 36.806 on Relay Security over the Un interface'"; 3GPP TSG-SA3 (Security), S3-100297; SA3#58; Xi'An, China; Feb. 1-5, 2010 (7 pages).
Catt; "Functionality of Un RRC Connection Reconfiguration Procedure"; 3GPP TSG RAN WG2 Meeting #70bis, R2-103597; Stockholm, Sweden; Jun. 28-Jul. 2, 2010 (3 pages).
3GPP TS 36.523-1 V9.1.1; "3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 9)"; Jun. 2010; pp. 592-594 (4 pages).
Office Action issued in Japanese Patent Application No. 2012-133803, mailing date Dec. 19, 2012, with English translation thereof (7 pages).
3GPP TSG-SA3 #58, S3-100297; "Review of Contribution R3-093305 on 'Text Proposal to TR 36.806 on Relay Security Over the Un Interface;'" SA 3; Xi'an, China; Feb. 1-5, 2010 (3 pages).
Office Action in corresponding Korean Patent Application No. 10-2013-7005705 dated Feb. 28, 2014, with translation (7 pages).
3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)"; Mar. 2010 (3 pages).
3GPP TS 36.413 V9.3.0; "3rd Generation Partnership Project; Technical Specification Group Radio Access Network; Evolved Universal Terrestrial Radio Access Network (E-UTRAN); S1 Application Protocol (S1AP) (Release 9)"; Jun. 2010 (5 pages).
3GPP TS 33.401 V9.4.0; "3rd Generation Partnership Project; Technical Specification Group Services and System Aspects; 3GPP System Architecture Evolution (SAE); Security architecture (Release 9)"; Jun. 2010 (5 pages).

\* cited by examiner

FIG. 4

INITIAL CONTEXT SETUP REQUEST

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 to <maxnoofE-RABs > | | | EACH | reject |
| >>E-RAB ID | M | | 9.2.1.2 | | - | |
| >>E-RAB Level QoS Parameters | M | | 9.2.1.15 | Includes necessary QoS parameters | - | |
| >>Transport Layer Address | M | | 9.2.2.1 | | - | |
| >>GTP-TEID | M | | 9.2.2.2 | | - | |
| >>NAS-PDU | O | | 9.2.3.5 | | - | |
| >> For S1/X2-AP | O | | | True or false | | |

FIG. 5

RRCConnectionReconfiguration message

```
-- ASN1START

RRCConnectionReconfiguration ::=    SEQUENCE {
    rrc-TransactionIdentifier       RRC-TransactionIdentifier,
    criticalExtensions              CHOICE {
        c1                                  CHOICE{
            rrcConnectionReconfiguration-r8     RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionReconfiguration-r8-IEs ::= SEQUENCE {
    measConfig                  MeasConfig                  OPTIONAL,    --
Need ON
    mobilityControlInfo         MobilityControlInfo         OPTIONAL,    --
Cond HO
    dedicatedInfoNASList        SEQUENCE (SIZE(1..maxDRB)) OF
                                DedicatedInfoNAS            OPTIONAL,    --
Cond nonHO
    radioResourceConfigDedicated    RadioResourceConfigDedicated  OPTIONAL, -- Cond
HO-toEUTRA
    securityConfigHO            SecurityConfigHO            OPTIONAL,    --
Cond HO
    nonCriticalExtension        RRCConnectionReconfiguration-v890-IEs   OPTIONAL
}
    ...

-- ASN1STOP
```

FIG. 6
RadioResourceConfigDedicated information element

```
-- ASN1START

RadioResourceConfigDedicated ::=        SEQUENCE {
    srb-ToAddModList                SRB-ToAddModList            OPTIONAL,       --
Cond HO-Conn
    drb-ToAddModList                DRB-ToAddModList            OPTIONAL,       --
Cond HO-toEUTRA
    drb-ToReleaseList               DRB-ToReleaseList           OPTIONAL,       --
Need ON
    mac-MainConfig                  CHOICE {
        explicitValue                   MAC-MainConfig,
        defaultValue                    NULL
    }        OPTIONAL,                                                          --
    ...

[[ rlf-TimersAndConstants-r9        RLF-TimersAndConstants-r9   OPTIONAL
    -- Need ON
    ]]
}
...

DRB-ToAddMod ::=    SEQUENCE {
    eps-BearerIdentity              INTEGER (0..15)             OPTIONAL,       -- Cond
DRB-Setup
    drb-Identity                    DRB-Identity,
    pdcp-Config                     PDCP-Config                 OPTIONAL,       -- Cond
PDCP
    rlc-Config                      RLC-Config                  OPTIONAL,       -- Cond
Setup
    logicalChannelIdentity          INTEGER (3..10)             OPTIONAL,       -- Cond
DRB-Setup
    logicalChannelConfig            LogicalChannelConfig        OPTIONAL,       -- Cond
Setup
    ...
}
...

-- ASN1STOP
```

FIG. 7
PDCP-Config information element

```
-- ASN1START

PDCP-Config ::=                 SEQUENCE {
    discardTimer                    ENUMERATED {
                                        ms50, ms100, ms150, ms300, ms500,
                                        ms750, ms1500, infinity
    }                                                   OPTIONAL,          --
Cond Setup
    rlc-AM                          SEQUENCE {
        statusReportRequired            BOOLEAN
    }                                                   OPTIONAL,          --
Cond Rlc-AM
    rlc-UM                          SEQUENCE {
        pdcp-SN-Size                    ENUMERATED {len7bits, len12bits}
    }                                                   OPTIONAL,          --
Cond Rlc-UM
    headerCompression               CHOICE {
        notUsed                         NULL,
        rohc                            SEQUENCE {
            maxCID                          INTEGER (1..16383)         DEFAULT
15,
            profiles                        SEQUENCE {
                profile0x0001                   BOOLEAN,
...
            },
            ...
        }
    },
    ...
    [[  integrityProtectionRequired-r9      ENUMERATED{true}      OPTIONAL   --
Need ON
    ]]
}

-- ASN1STOP
```

FIG. 9

Table 7.2.3-1: Information Elements in a Create Bearer Request

| Information elements | P | Condition / Comment | IE Type | Ins. |
|---|---|---|---|---|
| Procedure Transaction Id (PTI) | C | This IE shall be sent when the procedure was initiated by a UE Requested Bearer Resource Modification Procedure or Secondary PDP Context Activation Procedure. The PTI shall be the same as the one used in the corresponding Bearer Resource Command. | PTI | 0 |
| Linked Bearer Identity (LBI) | M | This IE shall be included to indicate the default bearer associated with the PDN connection. | EBI | 0 |
| Protocol Configuration Options (PCO) | O | | PCO | 0 |
| Bearer Contexts | M | Several IEs with this type and instance values shall be included as necessary to represent a list of Bearers. | Bearer Context | 0 |
| PGW-FQ-CSID | C | This IE shall be included by the PGW on the S5/S8 interfacesand shall be forwarded by the SGW on the S11 interface according to the requirements in 3GPP TS 23.007 [17]. | FQ-CSID | 0 |
| SGW-FQ-CSID | C | This IE shall be included by the SGW on the S11 Interface according to the requirements in 3GPP TS 23.007 [17]. | FQ-CSID | 1 |
| Change Reporting Action | C | This IE shall be included with the appropriate Action field If the location Change Reporting mechanism is to be started or stopped for this subscriber in the SGSN/MME. | Change Reporting Action | 0 |
| CSG Information Reporting Action | CO | This IE shall be included with the appropriate Action field if the CSG Info reporting mechanism is to be started or stopped for this subscriber in the SGSN/MME. | CSG Information Reporting Action | 0 |
| Private Extension | O | | Private Extension | VS |

NOTE: In the case that the procedure was initiated by a UE Requested Bearer Resource Modification Procedure or Secondary PDP Context Activation Procedure, then there will be only one instance of the Bearer Contexts IE in the Create Bearer Request.

FIG. 10

Table 7.2.3-2: Bearer Context within Create Bearer Request

| Octets 1 | Bearer Context IE Type = 93 (decimal) | | | |
|---|---|---|---|---|
| Octets 2 and 3 | Length = n | | | |
| Octets 4 | Spare and Instance fields | | | |
| Information elements | P | Condition / Comment | IE Type | Ins. |
| EPS Bearer ID | M | This IE shall be set to 0. | EBI | 0 |
| TFT | M | This IE can contain both uplink and downlink packet filters to be sent to the UE. Downlink packet filters are also used by SGW for PMIP based S5/8 interfaces. | Bearer TFT | 0 |
| S1-U SGW F-TEID | C | This IE shall be sent on the S11 interface if the S1-U interface is used. | F-TEID | 0 |
| S5/8-U PGW F-TEID | C | This IE shall be sent on the S4, S5/S8 and S11 interfaces. | F-TEID | 1 |
| S12 SGW F-TEID | C | This IE shall be sent on the S4 interface if the S12 interface is used. | F-TEID | 2 |
| S4-U SGW F-TEID | C | This IE shall be sent on the S4 interface if the S4-U interface is used. | F-TEID | 3 |
| Bearer Level QoS | M | | Bearer QoS | 0 |
| For S1/X2-AP use | O | S1/X2-AP bearer | | |
| Charging Id | C | This IE shall be sent on the S5/S8 interface. | Charging Id | 0 |
| | O | If the S5/S8 interface is GTP, this IE may be sent on the S4 interface, in order to support CAMEL charging at the SGSN. | | |
| Bearer Flags | O | Applicable flags are:<br>- PPC (Prohibit Payload Compression) | Bearer Flags | 0 |

MOBILE COMMUNICATION METHOD, MOBILE COMMUNICATION SYSTEM, AND RADIO BASE STATION

TECHNICAL FIELD

The present invention relates to a mobile communication method and a radio base station.

BACKGROUND ART

In an LTE (Long Term Evolution)-Advanced scheme, it is possible to use a relay node RN connectable to a radio base station DeNB (Doner eNB) through a Un interface.

The relay node RN is configured to perform radio communication with the radio base station DeNB via the Un interface, and perform radio communication with a mobile station UE via a Uu interface.

CITATION LIST

Non Patent Literature

[NPL 1] 3GPP TS36.300 (V10.0.0), "Evolved Universal Terrestrial Radio Access (E-UTRA) and Evolved Universal Terrestrial Radio Access Network (E-UTRAN) Physical Channels", June, 2010

[NPL 2] 3GPP TS33.401 (V9.4.0), "3GPP System Architecture Evolution (SAE); Security architecture", June 2010

SUMMARY OF INVENTION

Technical Problem

The LTE-Advanced scheme is configured such that in a radio space (hereinafter, the Un radio space) in which the Un interface is used, the signaling of the S1AP/X2AP layer is transmitted on DRB (Data Radio Bearer) as U-plane data.

In the Un radio space, if NDP (Network Domain Security)/IP is not used, in order to strengthen the security for the signaling of the S1AP/X2AP layer, it is necessary to perform integrity protection for the DRB.

However, a problem in the existing LTE-Advanced scheme was that the relay node RN and the radio base station DeNB could not identify the DRB for which it is necessary to perform integrity protection.

Therefore, the present invention has been achieved in view of the above-described problem, and an object thereof is to provide a mobile communication method and a radio base station with which it is possible to identify the DRB for which it is necessary to perform integrity protection.

Solution to Problem

A first characteristic of the present invention is summarized as a mobile communication method that sends and receives the signaling of a predetermined protocol layer on a data radio bearer established between a radio base station and a relay node, the mobile communication method comprising: a step of setting the data radio bearer in an attach process of the relay node; and a step of notifying, in an attach process of the relay node, the data radio bearer to the relay node and the radio base station.

A second characteristic of the present invention is summarized as a mobile communication method that sends and receives the signaling of a predetermined protocol layer on a data radio bearer established between a radio base station and a relay node, the mobile communication method comprising: a step of setting the data radio bearer after an attach process of the relay node is complete; and a step of notifying the data radio bearer to the relay node and the radio base station after an attach process of the relay node is complete.

A third characteristic of the present invention is summarized as a mobile communication method that sends and receives the signaling of a predetermined protocol layer on a data radio bearer established between a radio base station and a relay node, the mobile communication method comprising: a step of setting the data radio bearer in an attach process of the relay node; a step of notifying the data radio bearer to the radio base station in an attach process of the relay node; and a step of notifying the data radio bearer to the relay node after the attach process of the relay node is complete.

A fourth characteristic of the present invention is summarized as a radio base station that sends and receives the signaling of a predetermined protocol layer on a data radio bearer established with a relay node, wherein the radio base station is configured to set the data radio bearer in an attach process of the relay node; and notify the data radio bearer to the relay node in an attach process of the relay node.

A fifth characteristic of the present invention is summarized as a radio base station that sends and receives the signaling of a predetermined protocol layer on a data radio bearer established with a relay node, wherein the radio base station is configured to set the data radio bearer after an attach process of the relay node is complete; and notify the data radio bearer to the relay node after an attach process of the relay node is complete.

A sixth characteristic of the present invention is summarized as a radio base station that sends and receives the signaling of a predetermined protocol layer on a data radio bearer established with a relay node, wherein the radio base station is configured to set the data radio bearer in an attach process of the relay node; and notify the data radio bearer to the relay node after an attach process of the relay node is complete.

Advantageous Effects of Invention

As described above, according to the present invention, it is possible to provide a mobile communication method and a radio base station with which it is possible to identify the DRB for which it is necessary to perform integrity protection.

BRIEF DESCRIPTION OF DRAWINGS

FIG. 4 is a diagram illustrating an example of a format of "Initial Context Setup Request" used in the mobile communication system according to the first embodiment of the present invention.

FIG. 5 is a diagram illustrating an example of a format of "RRC Connection Reconfiguration" used in the mobile communication system according to the first embodiment of the present invention.

FIG. 6 is a diagram illustrating an example of a format of an information element "RadioResourceConfigDedicated" that can be set in "radioResourceConfigDedicated" in "RRC Connection Reconfiguration" used in the mobile communication system according to the first embodiment of the present invention.

FIG. 7 is a diagram illustrating an example of a format of an information element "PDCP-Config" that can be set in "pdcp-Config" in an information element "RadioResourceConfigDedicated" that can be set in "RadioResourceConfigDedicated" in the "RRC Connection Reconfiguration" used in the mobile communication system according to the first embodiment of the present invention.

FIG. 9 is a diagram illustrating an example of a format of "Create Bearer Context" used in the mobile communication system according to the first modification of the present invention.

FIG. 10 is a diagram illustrating an example of a format of an information element "Bearer Context" in "Create Bearer Context" used in the mobile communication system according to the first modification of the present invention.

DESCRIPTION OF EMBODIMENTS (Mobile Communication System According to First Embodiment of the Present Invention)

A mobile communication system according to a first embodiment of the present invention is described with reference to FIG. 1 through FIG. 7.

Figure 1:
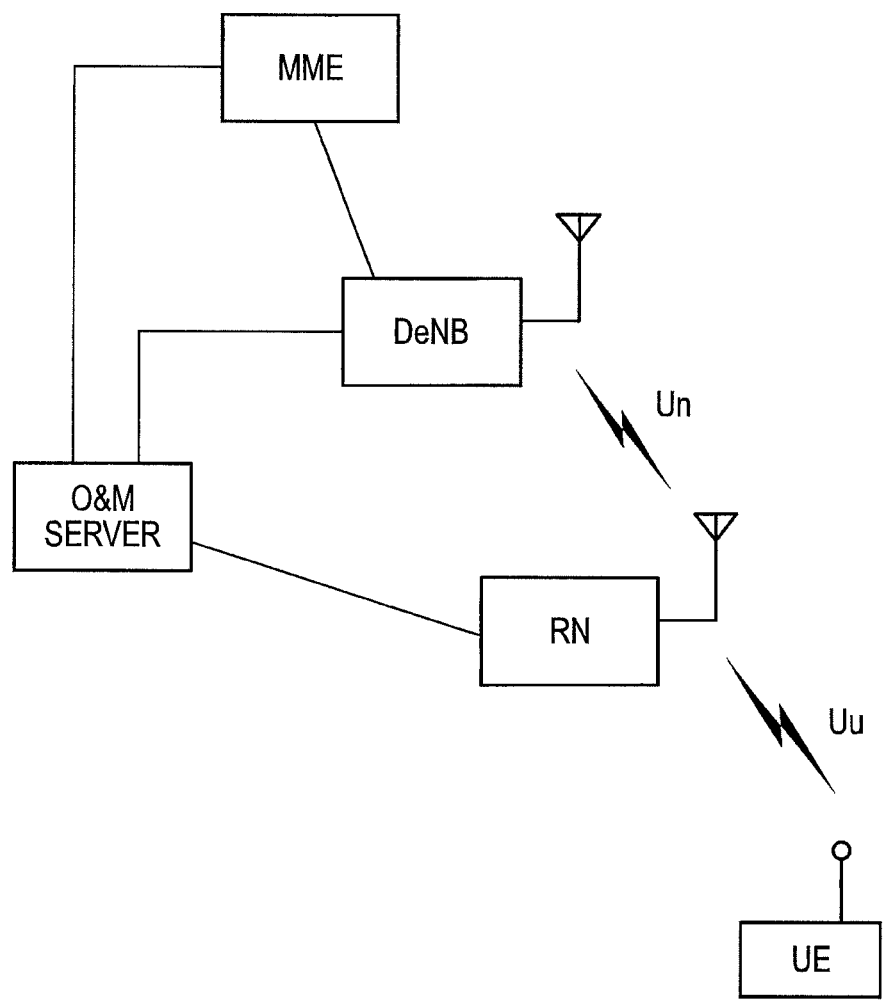
FIG. 1 is a diagram illustrating the entire configuration of a mobile communication system according to a first embodiment of the present invention.

The mobile communication system according to the present embodiment is an LTE-Advanced mobile communication system, and includes a subscriber information management server HSS (Home Subscriber Server), a mobile management node MME (Mobility Management Entity), a radio base station DeNB, a relay node RN, and an O&M (Operation and Maintenance) server, as illustrated in FIG. 1.

The relay node RN is configured to perform radio communication with the radio base station DeNB via the Un interface, and perform radio communication with a mobile station UE via a Uu interface.

Figure 2:
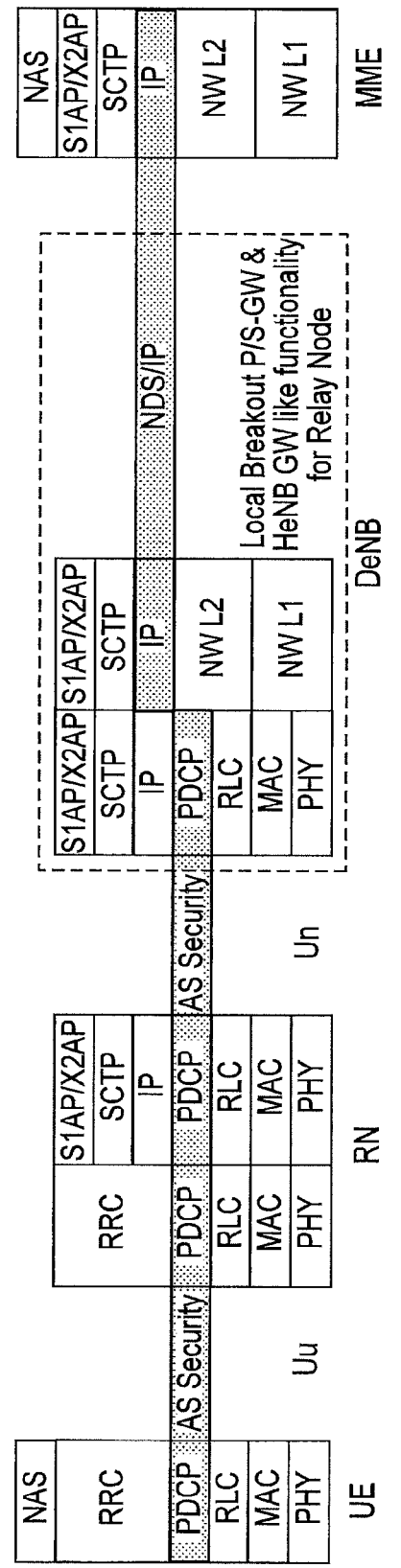
FIG. 2 is a protocol stack diagram of the mobile communication system according to the first embodiment of the present invention.

FIG. 2 illustrates a protocol stack used in the mobile communication system according to the present embodiment.

As illustrated in FIG. 2, the mobile station UE includes a physical (PHY) layer function, a MAC (Media Access Control) layer function provided as an upper-layer function of the physical (PHY) layer function, a RLC (Radio Link Control) layer function provided as an upper-layer function of the MAC layer function, a PDCP (Packet Data Convergence Protocol) layer function provided as an upper-layer function of the RLC layer function, a RRC (Radio Resource Control) layer function provided as an upper-layer function of the PDCP layer function, and a NAS (Non Access Stratum) layer function provided as an upper-layer function of the RRC layer function, in the radio space (hereinafter, the Uu radio space) in which the Uu interface is used.

Furthermore, the relay node RN includes a physical (PHY) layer function, a MAC layer function provided as an upper-layer function of the physical (PHY) layer function, a RLC layer function provided as an upper-layer function of the MAC layer function, a PDCP layer function provided as an upper-layer function of the RLC layer function, and a RRC layer function provided as an upper-layer function of the PDCP layer function, in the Uu radio space.

In addition, the relay node RN and the radio base station DeNB include a physical (PHY) layer function, a MAC layer function provided as an upper-layer function of the physical (PHY) layer function, a RLC layer function provided as an upper-layer function of the MAC layer function, a PDCP layer function provided as an upper-layer function of the RLC layer function, an IP (Internet Protocol) layer function provided as an upper-layer function of the PDCP layer, a SCTP (Stream Control Transmission Protocol) layer function provided as an upper-layer function of the IP layer function, and an S1AP/X2AP layer function provided as an upper-layer function of the SCTP layer function, in the Un radio space.

That is, the signaling of the S1AP/X2AP layer is configured to be sent and received on DRB that is established between the radio base station DeNB and the relay node RN (that is, the Un radio space).

Furthermore, the radio base station DeNB includes a network layer 1 (NW L1) function, a network layer 2 (NW L2) function provided as an upper-layer function of the network layer 1 function, an IP layer function provided as an upper-layer function of the network layer 2 function, a SCTP layer function provided as an upper-layer function of the IP layer function, and an S1AP/X2AP layer function provided as an upper-layer function of the SCTP layer function, in the interface with the mobile management node MME.

Similarly, the mobile management node MME includes a network layer 1 (NW L1) function, a network layer 2 (NW L2) function provided as an upper-layer function of the network layer 1 function, an IP layer function provided as an upper-layer function of the network layer 2 function, a SCTP layer function provided as an upper-layer function of the IP layer function, an S1AP/X2AP layer function provided as an upper-layer function of the SCTP layer function, and an NAS layer function provided as an upper layer function of the S1AP/X2AP layer function, in the interface with the radio base station DeNB.

NDS/IP may be used as the IP layer function of the radio base station DeNB and the mobile management node MME.

In the mobile communication system according to the present embodiment, of the DRBs established between the radio base station DeNB and the relay node RN, integrity protection is configured to be performed for the DRB that sends and receives the signaling of the S1AP/X2AP layer.

On the other hand, in the mobile communication system according to the present embodiment, of the DRBs established between the radio base station DeNB and the relay node RN, integrity protection is configured not to be performed for DRB other than the DRB that sends and receives the signaling of the S1AP/X2AP layer.

In the mobile communication system according to the present embodiment, the DRB that sends and receives the signaling of the S1AP/X2AP layer is configured to be set in the attach process of the relay node.

Furthermore, in the mobile communication system according to the present embodiment, the DRB that sends and receives the signaling of the S1AP/X2AP layer is configured to be notified to the relay node RN and the radio base station DeNB, in the attach process of the relay node RN.

Hereinafter, with reference to FIG. 3 through FIG. 7, the operation of the mobile communication system according to the present embodiment will be described.

Figure 3:
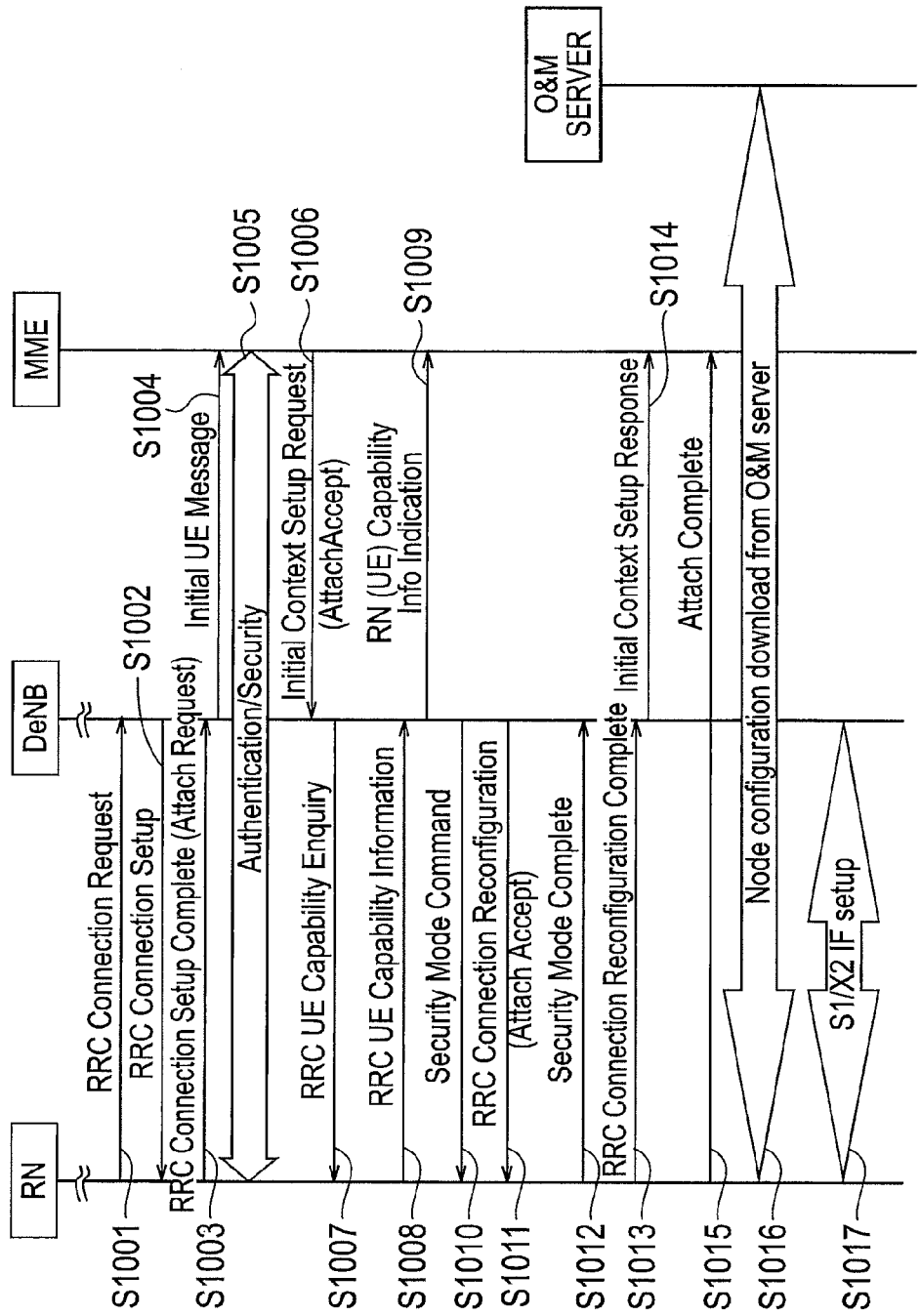
FIG. 3 is a sequence diagram showing the operation of the mobile communication system according to the first embodiment of the present invention.

As illustrated in FIG. 3, in step S1001, the relay node RN transmits "RRC Connection Request" to the radio base station DeNB.

In step S1002, the radio base station DeNB transmits "RRC Connection Setup" to the relay node RN.

In step S1003, the relay node RN transmits "RRC Connection Setup Complete" including "Attach Request" to the radio base station DeNB.

In step S1004, the radio base station DeNB transmits "Initial UE Message" to the mobile management node MME.

In step S1005, an "Authentication/Security" process is performed.

In step S1006, the mobile management node MME transmits "Initial Context Setup Request" including "Attach Accept" to the radio base station DeNB.

In addition to the default bearer, the mobile management node MME requests for the setup of DRB that sends and receives the signaling of the S1AP/X2AP layer. In such a case, the mobile management node MME notifies the radio base station DeNB about which bearer from among the setup bearers sends and receives the signaling of the S1AP/X2AP layer, through the "Initial Context Setup Request".

For example, as illustrated in FIG. 4, the mobile management node MME can notify whether or not the corresponding bearer is the DRB that sends and receives the signaling of the S1AP/X2AP layer, through "For S1/X2-AP" in "E-RAB to Be Setup Item IEs" in an information element "E-RAB to Be Setup List" in the "Initial Context Setup Request".

In step S1007, the radio base station DeNB transmits "RRC UE(RN) Capability Enquiry" to the relay node RN.

In step S1008, the relay node RN transmits "RRC UE(RN) Capability Information" to the radio base station DeNB.

In step S1009, the radio base station DeNB transmits "UE (RN) Capability Info Indication" to the mobile management node MME.

The radio base station DeNB transmits "Security Mode Command" to the relay node RN in step S1010, and transmits "RRC Connection Reconfiguration" including the "Attach Accept" to the relay node RN in step S1011.

The radio base station DeNB notifies the relay node RN as to which bearer from among the setup bearers is the DRB that sends and receives the signaling of the S1AP/X2AP layer (that is, the DRB for which it is necessary to perform integrity protection), through the "RRC Connection Reconfiguration".

For example, as illustrated in FIG. 5 through FIG. 7, the radio base station DeNB performs the above notification through "integrityProtectionRequired-r9" in an information element "PDCP-Config" that can be set in an information element "RadioResourceConfigDedicated" that can be set in the "RRC Connection Reconfiguration".

The relay node RN transmits "Security Mode Complete" to the radio base station DeNB in step S1012, and transmits "RRC Connection Reconfiguration Complete" to the radio base station DeNB in step S1013.

For example, in accordance with the stipulation of 3GPP TS33.401, the relay node RN generates the $Ks_{1X2\_int}$ key similar to the $K_{eNB}$ key, the $K_{RRC\_enc}$ key, the $K_{RCC\_int}$ key, and the $K_{UP\_enc}$ key in the DRB for which it is necessary to perform integrity protection, and similarly, in accordance with the stipulation of 3GPP TS33.401, the radio base station DeNB generates the $K_{S1X2\_int}$ key similar to the $K_eNB$ key, the $K_{RRC\_enc}$ key, the $K_{RRC\_int\ key,\ and\ the\ KUP\_enc}$ key in the DRB for which it is necessary to perform integrity protection.

In step S1014, the radio base station DeNB transmits "Initial Context Setup Response" to the mobile management node MME.

In step S1015, the relay node RN transmits "Attach Complete" to the mobile management node MME.

In step S1016, the relay node RN downloads the setup information of the relay node (Node Configuration) from the O&M server, and in step S1017, the relay node RN sets an S1/X2 interface with the radio base station DeNB.

According to the mobile communication system of the present embodiment, in the attach process of the relay node RN, the mobile management node MME notifies the DRB that sends and receives the signaling of the S1AP/X2AP layer to the radio base station DeNB through the "Initial Context Setup Request", and the radio base station DeNB can notify the DRB that sends and receives the signaling of the S1AP/X2AP layer (that is, the DRB for which it is necessary to perform integrity protection) to the relay node RN through the "RRC Connection Reconfiguration".

(First Modification)

Hereinafter, a mobile communication system according to a first modification will be described while focusing on the difference relative to the mobile communication system according to the above-described first embodiment, with reference to FIG. 8 through FIG. 10.

In the mobile communication system according to the present first modification, the DRB that sends and receives the signaling of the S1AP/X2AP layer is configured to be set after the attach process of the relay node is complete.

Furthermore, in the mobile communication system according to the present first modification, the DRB that sends and receives the signaling of the S1AP/X2AP layer is configured to be notified to the relay node RN and the radio base station DeNB after the attach process of the relay node RN is complete.

Hereinafter, with reference to FIG. 8 through FIG. 10, the operation of the mobile communication system according to the present first modification will be described.

Figure 8:
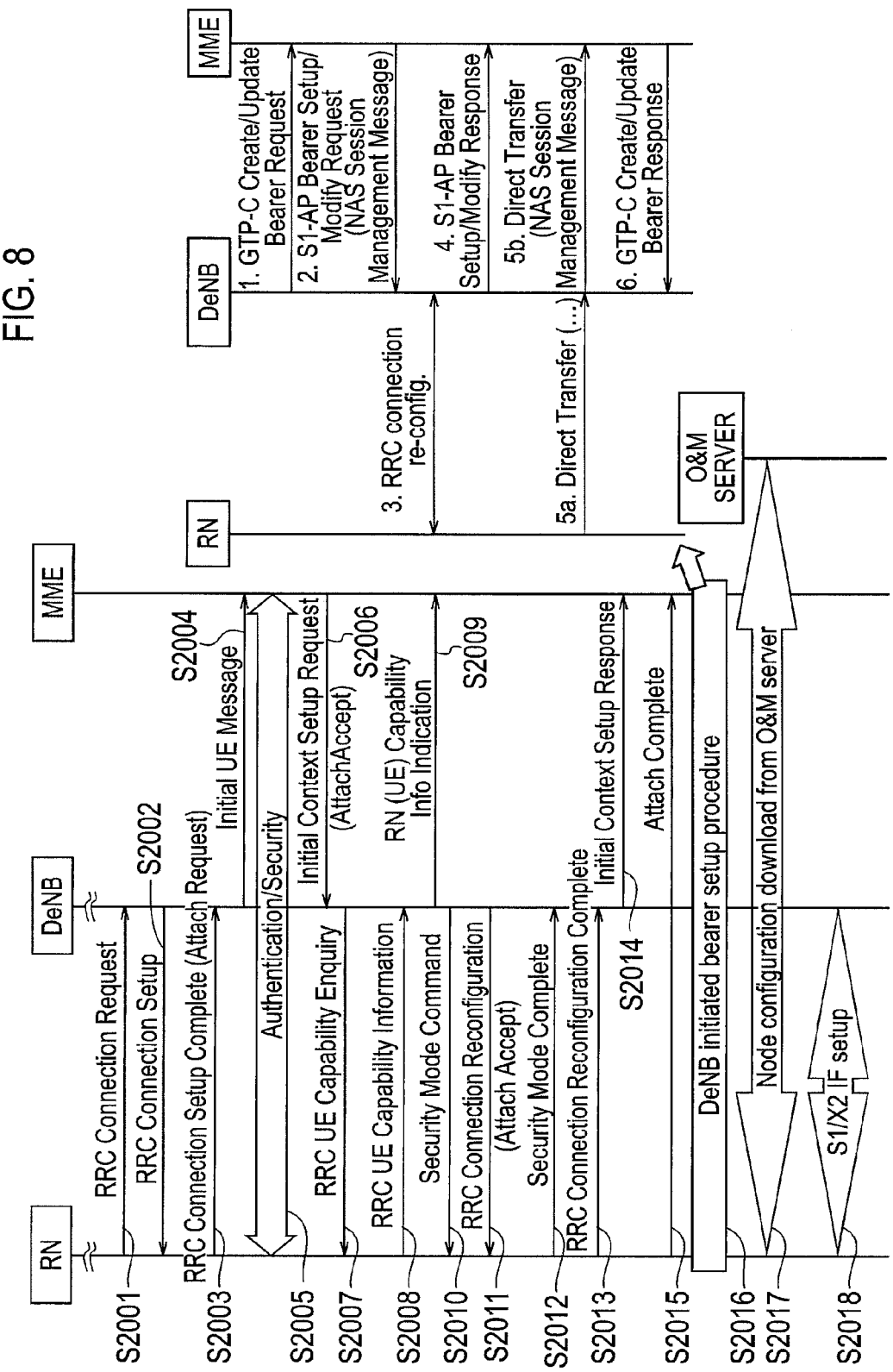
FIG. 8 is a sequence diagram showing an operation of a mobile communication system according to a first modification of the present invention.

As illustrated in FIG. 8, the operations in steps S2001 through S2015 are same as the operations in the steps S1001 through S1015 illustrated in FIG. 3. However, in the attach process of the relay node RN illustrated in the steps S2001 through S2015, the default bearer is set, and the DRB that sends and receives the signaling of the S1AP/X2AP layer is not set.

Following this, after the attach process of the relay node RN is complete, the process for setting the DRB that sends and receives the signaling of the S1AP/X2AP layer is performed in step S2016.

Specifically, as illustrated in FIG. 8, in step 1, the radio base station DeNB transmits "GTP-C Create/Update Bearer Request" to the mobile management node MME, and in step 2, the mobile management node MME transmits "S1-AP Bearer Create/Modify Request" to the radio base station DeNB.

The radio base station DeNB and the mobile management node MME notify which bearer from among the setup bearers is the DRB that sends and receives the signaling of the S1AP/X2AP layer, through the "GTP-C Create/Update Bearer Request" and "S1-AP Bearer Create/Modify Request".

For example, as illustrated in FIG. 9 and FIG. 10, the radio base station DeNB can notify whether or not the corresponding bearer is the DRB that sends and receives the signaling of the S1AP/X2AP layer, through "For S1/X2-AP use" in the an information element "Bearer Context" in the "GTP-C Create/Update Bearer Request".

In step 3, the radio base station DeNB transmits "RRC Connection Reconfiguration" to the relay node RN, and transmits "RRC Connection Reconfiguration Complete" to the radio base station DeNB.

As described above, the radio base station DeNB notifies the relay node RN as to which bearer from among the setup bearers is the DRB that sends and receives the signaling of the S1AP/X2AP layer (that is, the DRB for which it is necessary to perform integrity protection), through the "RRC Connection Reconfiguration".

For example, as illustrated in FIG. 9 and FIG. 10, the radio base station DeNB performs the above notification through "integrityProtectionRequired-r9" in an information element "PDCP-Config" that can be set in an information element "RadioResourceConfigDedicated" that can be set in the "RRC Connection Reconfiguration".

Alternatively, the radio base station DeNB may not perform the notification explicitly. In such a case, the relay node RN may determine that the bearer set by the processing in step S2016 is the DRB that sends and receives the signaling of the S1AP/X2AP layer (that is, the DRB for which it is necessary to perform integrity protection).

In step 4, the radio base station DeNB transmits "S1-AP Bearer Setup/Modify Response" to the mobile management node MME.

In step 5a, the relay node RN transmits "Direct Transfer" to the radio base station DeNB, and in step 5b, the radio base station DeNB transmits "Direct Transfer" to the mobile management node MME.

In step 6, the mobile management node MME transmits "GTP-C Create/Update Bearer Response" to the radio base station DeNB.

The operations of steps S2017 and S2018 are the same as those of the steps S1016 and S1017 illustrated in FIG. 3.

According to the mobile communication system of the present first modification, after the attach process of the relay node RN is complete, the mobile management node MME notifies the DRB that sends and receives the signaling of the S1AP/X2AP layer to the radio base station DeNB through "S1-AP Bearer Create/Modify Request", and the radio base station DeNB can notify the DRB that sends and receives the signaling of the S1AP/X2AP layer (that is, the DRB for which it is necessary to perform integrity protection) to the relay node RN through the "RRC Connection Reconfiguration".

(Second Modification)

Hereinafter, a mobile communication system according to a second modification will be described while focusing on the difference relative to the mobile communication system according to the above-described first embodiment, with reference to FIG. 11.

In the mobile communication system according to the present second modification, the DRB that sends and receives the signaling of the S1AP/X2AP layer is configured to be set in the attach process of the relay node.

Furthermore, in the mobile communication system according to the present second modification, the DRB that sends and receives the signaling of the S1AP/X2AP layer is configured to be notified to the radio base station DeNB in the attach process of the relay node RN, and is configured to be notified to the relay node RN after the attach process of the relay node RN is complete.

Hereinafter, with reference to FIG. 11, the operation of the mobile communication system according to the present second modification will be described.

Figure 11:
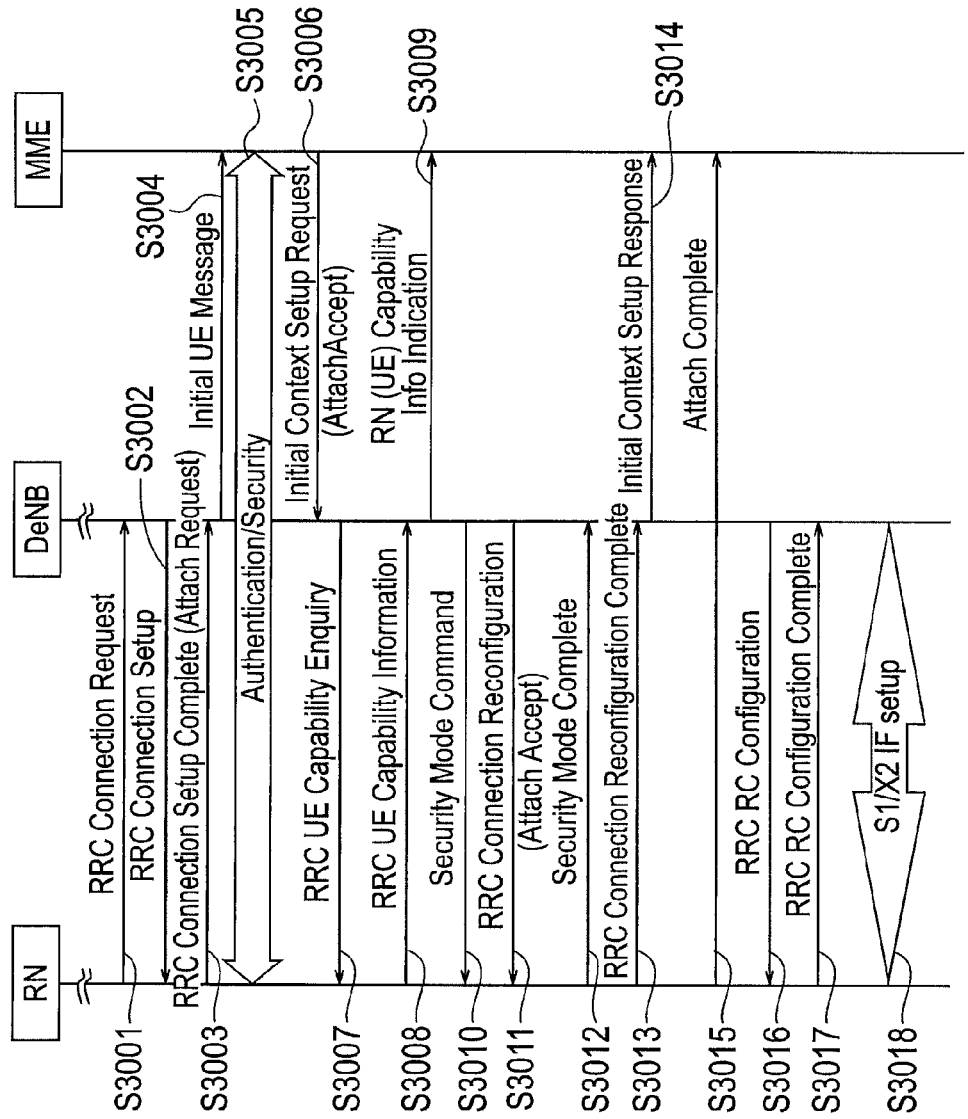
FIG. 11 is a sequence chart illustrating the operation of a mobile communication system according to a second modification of the present invention.

As illustrated in FIG. 11, the operations in steps S3001 through S3015 are equal to the operations in the steps S1001 through S1015 illustrated in FIG. 3. However, in the attach process of the relay node RN illustrated in the steps S3001 through S3015, in addition to the default bearer, the DRB that sends and receives the signaling of the S1AP/X2AP layer is set, but the corresponding DRB that sends and receives the signaling of the S1AP/X2AP layer is not notified to the relay node RN.

In step S3016, the radio base station DeNB notifies the relay node RN as to which bearer from among the setup bearers is the DRB that sends and receives the signaling of the S1AP/X2AP layer (that is, the DRB for which it is necessary to perform integrity protection), through "RRC RN Configuration".

For example, the radio base station DeNB transmits "RRC RN Configuration" including the identifier (DRB-ID) for identifying the DRB that sends and receives the signaling of the S1AP/X2AP layer, to the relay node RN.

In step S3017, the relay node RN transmits "RRC RN Configuration Complete" to the radio base station DeNB.

In step S3017, the relay node RN sets up an S1/X2 interface with the radio base station DeNB.

According to the mobile communication system of the present second modification, in the attach process of the relay node RN, the mobile management node MME notifies the DRB that sends and receives the signaling of the S1AP/X2AP layer to the radio base station DeNB through, for example, the "Initial Context Setup Request", and after the attach process of the relay node RN is complete, the radio base station DeNB can notify the DRB that sends and receives the signaling of the S1AP/X2AP layer (that is, the DRB for which it is necessary to perform integrity protection) to the relay node RN through the "RRC RN Configuration".

The characteristics of the present embodiment as described above may be expressed as follows.

A first characteristic of the present embodiment is summarized as a mobile communication method that sends and receives the signaling of an S1AP/X2AP layer (predetermined protocol layer) on DRB (data radio bearer) established between a radio base station DeNB and a relay node RN, the mobile communication method comprising: a step of setting the above DBR in an attach process of the relay node RN; and a step of notifying the above DRB to the relay node RN and the radio base station DeNB in an attach process of the relay node RN.

A second characteristic of the present embodiment is summarized as a mobile communication method that sends and receives the signaling of an S1AP/X2AP layer on DRB established between a radio base station DeNB and a relay node RN, the mobile communication method comprising: a step of setting the above DRB after an attach process of the relay node RN is complete; and a step of notifying the above DRB to the relay node RN and the radio base station DeNB after an attach process of the relay node RN is complete.

A third characteristic of the present embodiment is summarized as a mobile communication method that sends and receives the signaling of an S1AP/X2AP layer on DRB established between a radio base station DeNB and a relay node RN, the mobile communication method comprising: a step of setting the above DRB in an attach process of the relay node RN; a step of notifying the above DRB to the radio base station in an attach process of the relay node RN; and a step of notifying the above DRB to the relay node RN after the attach process of the relay node RN is complete.

A fourth characteristic of the present embodiment is summarized as a radio base station DeNB that sends and receives the signaling of an S1AP/X2AP layer on DRB established with a relay node RN, wherein the radio base station is configured to set the above DRB in an attach process of the relay node RN; and notify the above DRB to the relay node RN in an attach process of the relay node RN.

A fifth characteristic of the present embodiment is summarized as a radio base station DeNB that sends and receives the signaling of an S1AP/X2AP layer on DRB established with a relay node RN, wherein the radio base station is configured to set the above DRB after an attach process of the relay node RN is complete; and notify the above DRB to the relay node RN after an attach process of the relay node RN is complete.

A sixth characteristic of the present embodiment is summarized as a radio base station DeNB that sends and receives the signaling of an S1AP/X2AP layer on DRB established with a relay node RN, wherein the radio base station is configured to set the above DRB in an attach process of the relay node RN; and notify the above DRB to the relay node RN after an attach process of the relay node RN is complete.

It should be noted that the operation of the subscriber information management server HSS, the mobile management node MME, the radio base station DeNB, the relay node RN, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the subscriber information management server HSS, the mobile management node MME, the radio base station DeNB, the relay node RN, or the mobile station UE. Furthermore, such a storage medium and processor may be arranged in the subscriber information management server HSS, the mobile management node MME, the radio base station DeNB, the relay node RN, or the mobile station UE as discrete components.

Thus, the present invention has been explained in detail by using the above-mentioned embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

UE . . . Mobile station
MME . . . Mobile management node
RN . . . Relay node
DeNB . . . Radio base station
HSS . . . Subscriber information management server

The invention claimed is:

1. A mobile communication method, comprising:
a step of setting a radio bearer between a radio base station and a relay node in an attach process of the relay node;
a step of notifying the relay node, by the radio base station, of information to designate a data radio bearer for each radio bearer of a plurality of radio bearers to be set and a flag indicating whether it is necessary for the data radio bearer to perform integrity protection, by using an information element settable within "RRC Connection Reconfiguration";
a step of generating, by the relay node, a key for integrity protection, for the data radio bearer for which it is necessary to perform integrity protection, with reference to the flag notified by the "RRC Connection Reconfiguration"; and
a step of generating, by the radio base station, a key for performing integrity protection for the data radio bearer for which it is necessary to perform integrity protection, in a security mode command process performed in an attach process of the relay node.

2. A mobile communication system comprising a relay node and a radio base station, wherein
the mobile communication system is configured to set a radio bearer between the radio base station and the relay node in an attach process of the relay node,
the radio base station is configured to notify the relay node of information to designate a data radio bearer for each radio bearer of a plurality of radio bearers to be set and a flag indicating whether it is necessary for the data radio bearer to perform integrity protection, by using an information element settable within "RRC Connection Reconfiguration",
the relay node is configured to generate a key for integrity protection, for the data radio bearer for which it is necessary to perform integrity protection, with reference to the flag notified by the "RRC Connection Reconfiguration", and
the radio base station is configured to generate a key for performing integrity protection for the data radio bearer for which it is necessary to perform integrity protection, in a security mode command process performed in an attach process of the relay node.

3. A radio base station configured to set a radio bearer with a relay node, in an attach process of the relay node, wherein
the radio base station is configured to notify the relay node of information to designate a data radio bearer for each radio bearer of a plurality of radio bearers to be set and a flag indicating whether it is necessary for the data radio bearer to perform integrity protection, by using an information element settable within "RRC Connection Reconfiguration", and
the radio base station is configured to generate a key for performing integrity protection for the data radio bearer for which it is necessary to perform integrity protection, in a security mode command process performed in an attach process of the relay node.

* * * * *